No. 635,868. Patented Oct. 31, 1899.
S. B. PECK.
SCREW CONVEYER.
(Application filed Dec. 4, 1897.)
(No Model.)
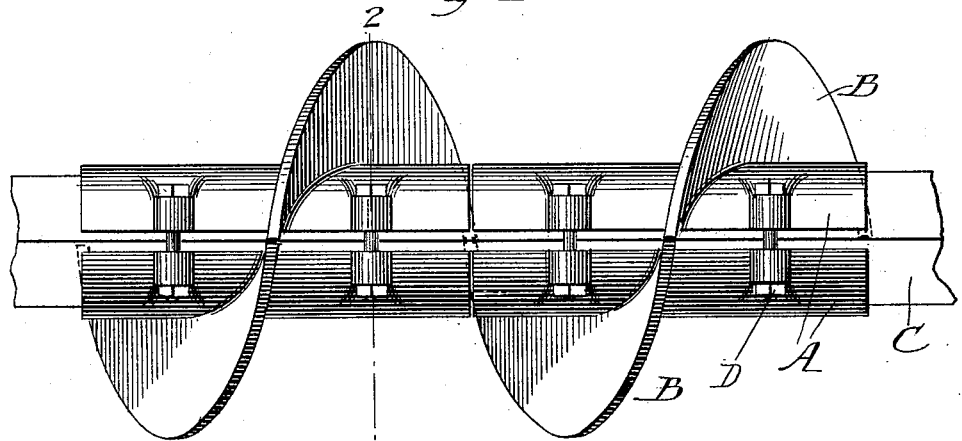
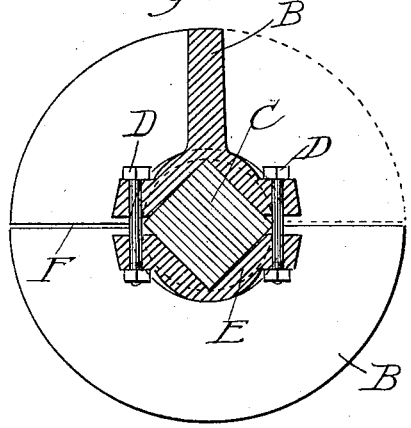
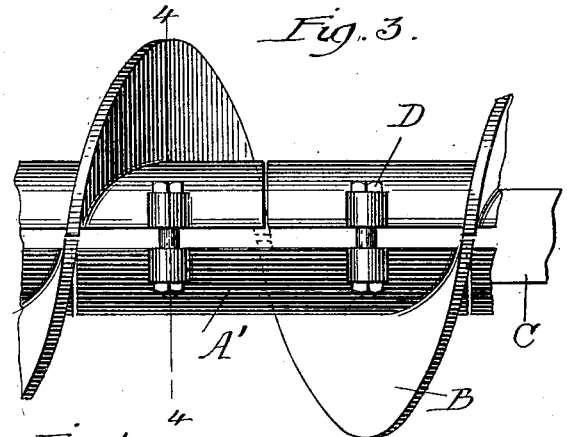
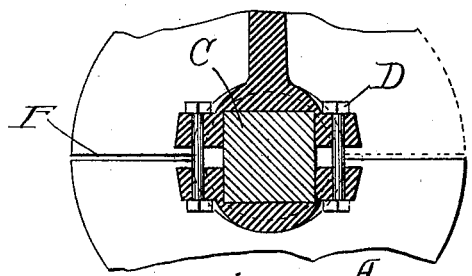
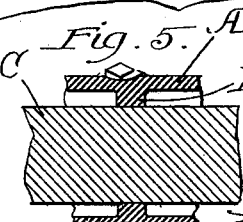
Witnesses:
Frank S. Blanchard
Donald M. Carter
Inventor:
Staunton B. Peck.
By Attorney
Francis W. Parker

United States Patent Office.

STAUNTON B. PECK, OF CHICAGO, ILLINOIS, ASSIGNOR TO THE LINK BELT MACHINERY COMPANY, OF SAME PLACE.

SCREW CONVEYER.

SPECIFICATION forming part of Letters Patent No. 635,868, dated October 31, 1899.

Application filed December 4, 1897. Serial No. 660,789. (No model.)

*To all whom it may concern:*

Be it known that I, STAUNTON B. PECK, a citizen of the United States, residing at Chicago, in the county of Cook and State of Illinois, have invented certain new and useful Improvements in Screw Conveyers, of which the following is a specification.

My invention relates to screw conveyers, and has for its object to provide a new and improved device of this description.

My invention is illustrated in the accompanying drawings, wherein—

Figure 1 is a view of a portion of a screw conveyer embodying my invention. Fig. 2 is a section on line 2 2, Fig. 1. Fig. 3 is a view similar to Fig. 1, showing the parts arranged so as to break joints. Fig. 4 is a section on line 4 4, Fig. 3. Fig. 5 is a longitudinal section of a portion of the screw.

Like letters refer to like parts throughout the several figures.

I have illustrated in the drawings a conveyer-screw made up from a series of parts, each part having a portion of a blade thereon, the several parts being fastened to a holding device or shaft, so as to be held in a fixed operative position with relation to each other. As illustrated in Fig. 1, a series of separable hub-like parts or sections A are provided each with a portion of a blade B, the separable sections adapted to be clamped to a holding device or shaft C, preferably square, said sections separable along the line of such shaft, so that any portion or section can be removed and replaced independent of the other sections. These separable sections are formed in any desired manner, preferably by casting, the two opposed sections being fastened together and clamped to the holding device or shaft by means of the bolts D D. The parts of each section are preferably formed so that they engage the shaft only for a portion of their length. As illustrated in the drawings, the inner faces of the sections are provided with the inwardly-projecting parts E opposite the clamping-bolts D and which engage the shaft, as shown in Figs. 2 and 5. These projections on the parts A insure a proper engagement with the shaft and permit the production of a cheaper and more efficient construction. These projections E reduce the engaging surface of the parts A with the shaft, and since said parts are cast it will be seen that this construction insures a tight clamping of the parts, so that there will be no movement with relation to each other or the shaft, and this result is obtained without the expense of fitting the parts, as would be the case if the parts A engaged the shaft the entire length. By placing these projections opposite the clamping-bolts the best results are obtained. These inwardly-projecting parts may be of any desired length. As illustrated in Figs. 1 and 2, the line of separation of the parts of the sections is substantially in line with two opposite corners of the shaft C. In Figs. 3 and 4 this line of separation between the parts of the sections A' is substantially perpendicular to the two faces of the shaft. It is of course evident that this line of separation may be made at any point desired. In Fig. 3 I have shown the several part sections clamped together, so as to break joints. It is of course evident that these sections may be of any desired shape or form and may be fastened together in any desired manner.

When the several parts are attached to the support or shaft, so as to form a complete operative screw conveyer, it will be seen that if any portion of a blade becomes injured it can be easily and quickly removed and replaced independent of and without in any manner disturbing any of the other sections or parts of the device. It will also be seen that I am enabled to form a stronger and more satisfactory screw conveyer in a much cheaper manner than has been heretofore possible.

My invention, as is evident, may be used in forming screw conveyers for any desired work and of any desired description. The portion of the blade on each hub-like part extends substantially to the edge of the part, so that the ends of said portion are substantially in the same plane as the surface formed by the longitudinal split through the hub-like part, so that when the several sections are brought together the ends of the adjacent blade portions abut or are in proximity to each other, so as to form a continuous screw-blade. It will be seen that the portion of the blade on each hub-like part has a double curvature, the ends of the adjoining blade portions abutting, so as to form a continuous screw, the hub-like portions forming a substantially continuous tube surrounding the shaft. It is particularly adapted for handling hot, coarse, or gritty material, such as ashes, ores, and the like. In the handling of such material the conveyer is subjected to injurious and unusual strains and conditions, and I have found by experience that the device herein shown is capable of withstanding such strains and operating in a satisfactory manner. By making the shaft non-circular and forming the blade portions integral with the hub-like parts I am enabled to shape the hub-like parts to fit the non-circular shaft, and hence the strain during the operation of the conveyer is removed from the bolts, the bolts simply acting to prevent the parts from separating. It will thus be seen that the hub-like parts form a shell which fits the shaft and which takes all the torsional strain, thus insuring the proper operation of the device and preventing the destruction of the parts due to the injury of the bolts, which heretofore have been used for resisting the strain when the conveyer is in operation.

I claim—

1. A conveyer-screw, comprising a shaft, a series of separate screw-sections, each consisting of a hub-like part with a portion of the screw-blade integral therewith, each screw-blade portion having a compound curvature, the ends of the screw-blade portions being substantially in the plane of the longitudinal split through the hub-like part, said sections adapted to be clamped together upon said holding device or shaft, the ends of the blade portions abutting so as to form a continuous screw, but being independent of each other.

2. A conveyer-screw, comprising a non-circular shaft, a series of separate screw-sections, each consisting of a hub-like part with a portion of the blade of the screw integral therewith, said sections formed to fit the non-circular shaft, so as to receive the torsional strain during the operation of the conveyer, and clamping devices for holding said sections in proper relation to said shaft so as to form a substantially continuous spiral conveyer-screw.

3. A conveyer-screw, comprising a non-circular shaft, a series of separate screw-sections, each consisting of a hub-like part with a portion of the blade of the screw integral therewith, suitable clamping-bolts associated with said sections, so that they may be clamped together, said sections shaped to fit the non-circular shaft so that when in position a shell is formed around the shaft, which engages the shaft and bears the torsional strain when the screw is in operation, thus relieving the clamping-bolts from such strain, substantially as described.

STAUNTON B. PECK.

Witnesses:
DONALD M. CARTER,
HOMER L. KRAFT.